United States Patent Office 3,631,001
Patented Dec. 28, 1971

3,631,001
PROCESS FOR PREPARING POLYCAPROLACTAM
Soji Arakawa and Koichi Matuya, Uji-shi, Yasuro Kobayashi, Kyoto-shi, and Minoru Matsushita and Tosihiko Tukamoto, Uji-shi, Japan, assignors to Nippon Rayon Kabushiki Kaisha, Uji-shi, Kyoto-fu, Japan
No Drawing. Filed Jan. 22, 1969, Ser. No. 793,154
Claims priority, application Japan, Jan. 24, 1968, 43/4,201
Int. Cl. C08g 20/18
U.S. Cl. 260—78 L    9 Claims

ABSTRACT OF THE DISCLOSURE

This invention relates to a process for preparing polycaprolactam, in which ε-caprolactam is polymerized in the presence of an alkali-type catalyst to form a polymer and one or more phosphorus compounds are then added to said polymer. The polymerized product of ε-caprolactam thus formed is characterized by its lack of the diminution of the viscosity in the molten state.

BACKGROUND OF INVENTION

It is well known that the polymerization reaction of ε-caprolactam can be remarkably accelerated in the presence of an alkali catalyst. In comparison with the conventional polymerization process using water catalyst, the former process is superior because of its greater reaction rate. On the other hand, there are disadvantages which make this process generally inapplicable in industrial practice. One such disadvantage is that viscosity of the molten polymer is liable to decrease gradually, depending upon the period of time when it is in molten state. Accordingly, it is difficult to obtain uniformity of the polymerized product. Substantial lowering of the viscosity of the polymerized product occurs for example during discharge of the melt from the polymerization vessel or during spinning into fiber.

The present process serves to overcome the aforementioned defects by adding certain phosphorus-containing compounds to the polycaprolactam prepared in the presence of an alkali catalyst.

SUMMARY OF INVENTION

It is an object of this invention to provide a process for preparing polycaprolactam in the presence of an alkali catalyst without the diminution of the viscosity of the polymerized product in its molten state.

Another object of this invention is to provide rapidly polymerized polycaprolactam free from the diminution of its viscosity in its molten state.

Other objects and features of this invention will be apparent on reading the following specification and claims.

According to the present invention, there is provided a process for preparing polycaprolactam, in which the polymerization of ε-caprolactam is carried out in the presence of an alkali-type catalyst to form a polymer and one or more phosphorus compounds selected from the class consisting of the following and mixtures thereof are then added to said polymer:

(a) A phosphorus compound phosphoric acid, phosphorous acid, hypophosphorous acid, pyrophosphoric acid, metaphosphoric acid and triphosphoric acid, (b) A substituted phosphorus compound of (a), wherein at least a part of its hydrogen atoms is substituted by at least one member selected from the class consisting of —NH$_4$, an aliphatic group having 1 to 18 carbon atoms and an aromatic group having 6 to 10 carbon atoms, (c) A substituted phosphorus compound of (a), wherein a part of its hydrogen atoms is substituted by at least one member selected from the class consisting of an alkali metal and alkaline earth metal, or (d) A substituted phosphorus compound of (a), in which a part of its hydrogen atoms is substituted by at least one member selected from the class consisting of alkali metals and alkaline earth metals and in which at least a part of the remaining hydrogen atoms is substituted by at least one member selected from the class consisting of —NH$_4$, an aliphatic group having 1 to 18 carbon atoms and an aromatic group having 6 to 10 carbon atoms. Group (d) is accordingly a special species of groups (b) and (c).

The prosphorus compounds which may be used for the purpose of this invention can be exemplified by the following compounds:

Group (a): Phosphoric acid, phosphorous acid, hypophosphorous acid, pyrophosphoric acid, metaphosphoric acid, polyphosphoric acid;

Group (b): Ammonium dihydrogen phosphate, ammonium monohydrogen phosphate, ammonium phosphite, ammonium metaphosphate, monoethyl phosphate, triethyl phosphate, triphenyl phosphate, tricresyl phosphate, methyl dibenzyl phosphate, tribenzyl phosphate, tri-α-naphtyl phosphate, diethyl phosphite, tributyl phosphite, trioctadecyl phosphite, triphenyl phosphite, mono-a'-naphtyl phosphite, tetraethyl pyrophosphate;

Group (c): Potassium dihydrogen phosphate, calcium dihydrogen phosphate, calcium monohydrogen phosphate, sodium hydrogen phosphite, sodium hydrogen pyrophosphate;

Group (d): Sodium ammonium hydrogen phosphate, calcium ammonium phosphate.

The stability of the viscosity of the polycaprolactam in its molten state can be obtained according to this invention in the following manner.

An alkali catalyst is uniformly dissolved in a normal amount of about 1/50 to 1/1500 mols per mol of ε-caprolactam in ε-caprolactam at a temperature of from about 70 to 150° C. in an inert atmosphere all in a conventional manner. The polymerization reaction is carried out at a temperature of from about 150 to 300° C. in conventional manner.

After this the compound of this invention is added to the polymer in an amount of 0.01 to 5, preferably 0.1 to 1, weight percent based on polymer.

By the use of the phosphorus compound of this invention, it is not only possible to inhibit the loss of viscosity of the polymer obtained which will occur when it is in molten state, but also possible to obtain the desired viscosity by suitably selecting the amount and type of phosphorus compound to be added and the time at which the compound is added thereto. It is also found that the color tone of the obtained polymer can be improved.

According to the present invention, the phosphorus compound can be added to the polymerized materials when they are in molten state. It is also possible to add the phosphorus compound to the cooled polymerized substances and then melting the same to suitably incorporate the phosphorus compound. Equivalent results are obtained by both methods.

The ε-caprolactam to be used for the process of this invention is preferably anhydrous. It is also possible to use substantially anhydrous ε-caprolactam containing water in such amounts which do not harm the polymerization reaction.

Any and all known alkali catalysts, such as for example alkali metals, alkaline earth metals, and hydroxides, hydrides, carbonates and organic compounds of these metals and Grignard reagents may be used for the purpose of this invention. Such catalysts are referred to in the claims as "alkali catalyst."

The following non-limitative examples illustrate the invention.

In the examples, the term "part" denotes the part by weight. The relative viscosity was determined as the ratio of time required by (a) a solution prepared by dissolving the demonomered polymer (0.25 g.) in 96% sulfuric acid (25 ml.) to pass through a predetermined distance in Ubbelohde's viscometer at 25° C., to (b) the time required in an analogous test to that described except that polymer was not added to the solution.

Example 1

To ε-caprolactam was added sodium-ε-caprolactam in an amount of 1/400 mols of sodium ε-caprolactam per one mol of ε-caprolactam, and uniformly dissolved therein at 80° C. in nitrogen atmosphere. The solution was then heated at 255° C. for one hour in a Dowtherm bath to give a polymer, which was then powdered to give a sample having a relative viscosity of 3.01.

(a) The sample (20 grams) was put into a polymerization tube and heated with stirring at 255° C. in a nitrogen atmosphere for one hour to produce a polymer having relative viscosity of 2.82. Another sample was treated in a similar manner to that described above with the exception of the heating time (3 hours) to give a relative viscosity of 2.43.

(b) Similar treatments to those described in item (a) were repeated with the exception that 60 mg. of phosphoric acid (min. 85%) was added to each sample to result in corresponding relative viscosity values of 3.15 and 3.24 respectively.

(c) 20 grams of the polymer sample was put into each of three polymerization tubes. Phosphorus compounds were added to each tube as follows: Calcium dihydrogen phosphate (to the first tube; 60 mg.), metaphosphoric acid (to the second tube; 20 mg.) and polyphosphoric acid (to the 3rd tube; 60 mg.), respectively.

Each tube was heated with stirring at 255° C. in a nitrogen atmosphere for 3 hours, and the relative viscosity determined to be 2.95, 2.81 and 2.86, respectively for each sample.

Example 2

Chips (columnar shape; diameter, 2 mm.; height, 2 mm.) were prepared from a polymer (relative viscosity, 2.68), which was obtained in a similar manner to that described in Example 1 with the exception of the heating time (3 hours).

The chips (20 grams) were put into a polymerization tube and were heated in a nitrogen atmosphere at 255° C. with stirring for 4 hours to give a polymer having a relative viscosity of 2.27. 20 gram samples of the chips were then put into each of five polymerization tubes.

Phosphorous compounds were added to each tube as follows: phosphorous acid (to the first tube; 20 mg.), ammonium metaphosphate (to the second tube; 20 mg.), triethyl phosphate (to the third tube; 60 mg.), triphenyl phosphate (to the fourth tube; 60 mg.), and tricresyl phosphate (to the fifth tube; 60 mg.). Each tube was heated with stirring at 255° C. in nitrogen atmosphere for four hours. The polymers obtained had, respectively, the following relative viscosities 2.59 (the first tube), 2.71 (the second tube), 2.55 (the third tube), 2.63 (the fourth tube) and 2.59 (the fifth tube).

Example 3

Sodium metal was added to ε-caprolactam in an amount of 1/200 mols of sodium metal per one mole of ε-caprolactam and was uniformly dissolved therein at 100° C. in a nitrogen atmosphere. The resultant solution was polymerized at 255° C. for 10 minutes to give a polymer having a relative viscosity of 2.89, which was then powdered to give a sample. 20 grams of the sample was put into a polymerization tube and heated at 255° C. for 3 hours with stirring in nitrogen atmosphere to give a relative viscosity of 2.05.

20 grams of said powdery sample was added to each of three polymerization tubes. The first, second and third tubes were each respectively additionally charged with methyl dibenzyl phosphate (60 mg.), tri-a′ naphtyl phosphate (100 mg.) and tributyl phosphate (20 mg.). They were heated at 255° C. for 3 hours with stirring in nitrogen atmosphere. The polymers thus obtained had respectively the following relative viscosities.

| Tube No.: | Relative viscosity |
|---|---|
| 1 | 2.72 |
| 2 | 2.61 |
| 3 | 2.69 |

Example 4

20 g. of ε-caprolactam and 60 mg. of sodium-ε-caprolactam were added to each of seven polymerization tubes and uniformly dissolved at 80° C. in nitrogen atmosphere. These tubes were heated at 255° C. for one hour with stirring in a nitrogen atmosphere. After this, one of said tubes was cooled to measure relative viscosity of the polymer therein. It was 3.10.

The remaining six tubes were maintained at the same temperature and to each was added the following phosphorus compounds: 60 mg. of trioctadecyl phosphite (first), 20 mg. of triphenyl phosphite (second), 60 mg. of tetraethyl pyrophosphate (third), 60 mg. of potassium dihydrogen phosphate (fourth) and 20 mg. of ammonium dihydrogen phosphate (fifth). Nothing was added to the sixth tube. The tubes were then further heated for one hour at the same temperature with stirring. The stirring was discontinued for a short time to sample out a part of each melt. Then stirring was again started and continued for 2 hours at the same temperature. Relative viscosities of thus obtained polymers in the first to sixth tube were 3.38, 2.99, 2.84, 2.96, 2.83 and 2.35, respectively, while relative viscosities of the polymers sampled out halfway in the treatment were 3.12, 3.01, 2.91, 2.96, 2.98 and 2.77, respectively.

Example 5

ε-Caprolactam and sodium metal were mixed (1/100 mol of sodium metal per one mol of ε-caprolactam) and were dissolved uniformly at 80° C. in nitrogen atmosphere to give a solution, which was then heated at 255° C. for one hour to give a polymer (relative viscosity, 2.01). The polymer obtained was powdered and was further heated at 255° C. for 3 hours with stirring to give a relative viscosity of 1.47. The said powdery polymer (20 grams) and the following additives were respectively charged into each of three polymerization tubes and were heated at 255° C. for 3 hours with stirring in nitrogen atmosphere to give the relative viscosities, respectively, as follows:

| Tube No. | Additive (amount) | Relative viscosity |
|---|---|---|
| 1 | Sodium ammonium hydrogen phosphate (60 mg.) | 1.91 |
| 2 | Calcium ammonium phosphate (60 mg.) | 1.83 |
| 3 | Phenyl hydroxy sodiumoxy phosphane oxide (100 mg.) | 1.89 |

Remarks: In all examples, polymerization tubes used were made of Pyrex glass and had the same dimension; inner diameter of 2.5 cm, and the height of 24.5 cm, As illustrated by the above examples, addition of the phosphorus compounds of the present invention to polycaprolactam produced by alkali catalyses reduces the viscosity loss of the polymer when in the molten state.

Various modifications will suggest themselves, to those skilled in the art, including processing the present polymers by normal techniques employed with polycaprolactam polymers.

What we claim is:

1. In a process for preparing polycaprolactam wherein ε-caprolactam is polymerized in the presence of an alkali catalyst to form a moldable polymer by anionic polymerization, the improvement which comprises adding to said polymer after polymerization an additive consisting essentially of one or more phosphorus compounds to thereby inhibit the lowering of the viscosity of the polymer in the molten state, said phosphorus compound being chosen from the group consisting of (a) a member of the group consisting of phosphoric acid, phosphorous acid, hypophosphorous acid, pyrophosphoric acid, metaphosphoric acid and triphosphoric acid, (b) a substituted phosphorus compound of (a), in which at least a part of its hydrogen atoms is substituted by at least one member selected from the class consisting of —$NH_4$, an aliphatic group having 1 to 18 carbon atoms and an aromatic group having 6 to 10 carbon atoms, (c) a substituted phosphorus compound of (a), in which a part of its hydrogen atoms is substituted by at least one member selected from the class consisting of an alkali metal and an alkaline earth metal, (d) a substituted phosphorus compound of (a), in which a part of its hydrogen atoms is substituted by at least one member selected from the class consisting of an alkali metal and an alkaline earth metal and in which at least a part of the remaining hydrogen atoms is substituted by at least one member selected from the class consisting of —$NH_4$, an aliphatic group having 1 to 18 carbon atoms and an aromatic group having 6 to 10 carbon atoms.

2. The process of claim 1, in which the polymerization reaction is carried out at a temperature of from 150 to 300° C. in the presence of the alkali-type catalyst in an amount of 1/50 to -/1500 mols per one mol of ε-caprolactam to form a polymer and one or more phosphorus compounds in an amount of 0.01 to 5% by weight based on polymer is then added to said polymer.

3. The process of claim 1, in which the phosphorus compound is characterized by (b) and selected from the group consisting of ammonium dihydrogen phosphate, ammonuium monohydrogen phosphate, ammonium phosphite, ammonium metaphosphate, monoethyl phosphate, triethyl phosphate, triphenyl phosphate, tricresyl posphate, methyl dibenzyl phosphate, tribenzyl phosphate, tri-a'-naphthyl phosphate, diethyl phosphite, tributyl phosphite, trioctadecyl posphite, triphenyl phosphite, mono-a'-naphtyl phosphite, and tetraethyl pyrophosphate.

4. The process of claim 1 in which the phosphorus compound is characterized by (c) and is selected from the group consisting of potassium dihydrogen phosphate, calcium dihydrogen phosphate, calcium monohydrogen phosphate, sodium hydrogen phosphite, and sodium hydrogen pyrophosphate.

5. The process of claim 1 in which the phosphorus compound is characterized by (d) and selected from the group consisting of sodium ammonium hydrogen phosphate and calcium ammonium phosphate.

6. The process of claim 1 wherein said phosphorus compound is added in an amount of 0.1 to 1 weight percent based on polymer.

7. The process of claim 1 wherein said phosphorus compound is added to said polymer while it is in a molten state.

8. The process of claim 1 wherein said phosphorus compound is added to solid polymer, and the mixture then heated to molten conditions.

9. The process of claim 1, in which said ε-caprolactam is substantially anhydrous.

References Cited

UNITED STATES PATENTS

| | | | |
|---|---|---|---|
| 2,981,715 | 4/1961 | Ben | 260—45.7 |
| 3,078,248 | 2/1963 | Ben | 260—30.6 |
| 3,344,107 | 9/1967 | Miller | 260—37 |
| 3,410,832 | 11/1968 | Griehl et al. | 260—78 |
| 3,418,268 | 12/1968 | Hedrick et al. | 260—37 |
| 3,437,641 | 4/1969 | Lenz et al. | 260—78 |
| 3,448,087 | 6/1969 | Ballentine et al. | 260—78 |

OTHER REFERENCES

Grant, Hackh's Chemical Dictionary, 3rd ed., McGraw-Hill, N.Y., 1944, p. 649.

Rose, The Condensed Chemical Dictionary, 7th ed., Rheinhold, N.Y., 1966, p. 764.

WILLIAM H. SHORT, Primary Examiner

L. M. PHYNES, Assistant Examiner

U.S. Cl. X.R.

260—45.7 P